US008949421B2

(12) United States Patent
Tackett

(10) Patent No.: US 8,949,421 B2
(45) Date of Patent: Feb. 3, 2015

(54) TECHNIQUES FOR DISCOVERING DATABASE CONNECTIVITY LEAKS

(75) Inventor: Dennis Avery Tackett, Youngsville, NC (US)

(73) Assignee: Teradata US, Inc., Dayton, OH (US)

( * ) Notice: Subject to any disclaimer, the term of this patent is extended or adjusted under 35 U.S.C. 154(b) by 1118 days.

(21) Appl. No.: 12/639,471

(22) Filed: Dec. 16, 2009

(65) Prior Publication Data

US 2011/0029959 A1 Feb. 3, 2011

Related U.S. Application Data

(60) Provisional application No. 61/229,393, filed on Jul. 29, 2009.

(51) Int. Cl.
*G06F 15/173* (2006.01)
*G06F 15/16* (2006.01)
*G06F 9/44* (2006.01)
*G06F 17/30* (2006.01)

(52) U.S. Cl.
CPC .... *G06F 17/30504* (2013.01); *G06F 17/30306* (2013.01)
USPC ............ 709/225; 709/226; 709/229; 717/131

(58) Field of Classification Search
USPC ........................... 709/226, 227, 229; 717/131
See application file for complete search history.

(56) References Cited

U.S. PATENT DOCUMENTS

| 7,028,039 | B2 | 4/2006 | Burrows et al. |
| 7,512,682 | B2 | 3/2009 | Aronoff et al. |
| 7,698,434 | B2 * | 4/2010 | June et al. ..................... 709/227 |
| 2007/0101344 | A1 * | 5/2007 | Srivastava .................... 719/321 |
| 2007/0136311 | A1 | 6/2007 | Kasten et al. |
| 2007/0185835 | A1 | 8/2007 | Ursitti et al. |
| 2007/0192328 | A1 * | 8/2007 | Handa et al. ................... 707/10 |
| 2008/0071785 | A1 | 3/2008 | Kabra et al. |
| 2008/0270600 | A1 * | 10/2008 | Tankov et al. ................ 709/224 |
| 2009/0234957 | A1 | 9/2009 | Li et al. |
| 2009/0292953 | A1 * | 11/2009 | Barghouthi et al. ............ 714/40 |

* cited by examiner

*Primary Examiner* — Viet Vu
*Assistant Examiner* — Herman Belcher
(74) *Attorney, Agent, or Firm* — Schwegman, Lundberg & Woessner, P.A.

(57) ABSTRACT

Techniques for discovering database connectivity leaks are presented. Each connection made by an application to a database is monitored. When the application is shut down, if information regarding a particular connection remains in memory, then that connection is reported as a potential database connectivity leak.

20 Claims, 3 Drawing Sheets

TECHNIQUES FOR DISCOVERING DATABASE CONNECTIVITY LEAKS

RELATED APPLICATION

This application is with and includes the same inventor as Provisional Application No. 61/229,393 filed on Jul. 29, 2009 and entitled: "Techniques for Discovering Database Connectivity Leaks;" and the present application is a non-provisional of that Provisional Application and claims priority thereto and incorporates by reference the entirety of that Provisional Application herein.

BACKGROUND

One of the most common and most serious problems in software application development is a failure to properly close connections to an underlying relational database. This is most commonly called 'leaking connections' or a 'connection leak'. This problem is serious, and can degrade or even render unusable an application over time. Detecting the specific piece of application code that failed to close a connection is often extremely difficult, especially in high volume multi-threaded applications. The usual approach is a laborious manual inspection of suspect code or, if the problem can be recreated, debugging through the application source until the problem cause is determined.

Thus, improved mechanisms for discovering database connectivity leaks are needed.

SUMMARY

In various embodiments, techniques for discovering database connectivity leaks are provided. Specifically, a method to discover database connectivity leaks is presented. Connections made to a database from an application are detected. A unique connection record is maintained for each separate connection when that connection is established to the database. Any remaining connection records that remain when the application is shut down are reported as potential database connectivity leaks.

DETAILED DESCRIPTION

Figure 1:
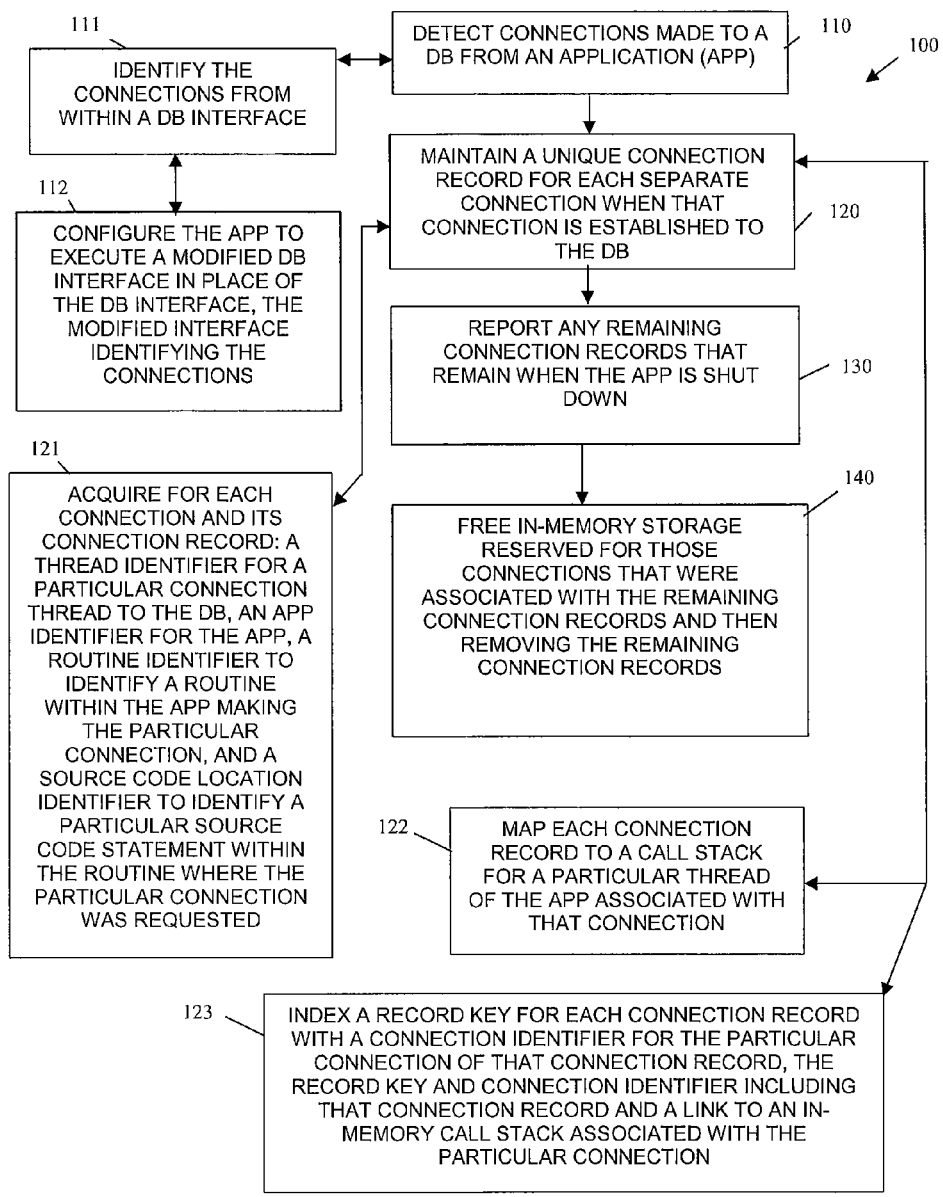
FIG. 1 is a diagram of a method for discovering database connectivity leaks, according to an example embodiment.

FIG. 1 is a diagram of a method 100 for discovering database connectivity leaks, according to an example embodiment. The method 100 (hereinafter referred to as "leak discovery service") is implemented as instructions within a computer-readable storage medium and executes on one or more processors of a network. The processors are specifically configured to execute the leak discovery service. The leak discovery service is also operational over a network, the network can be wired, wireless, or a combination of wired and wireless.

At 110, the leak discovery service detects connections made to a database from an application. For instance, consider a web server that processes Internet requests to a back-end enterprise database. In this example, the web server is the application making connections to the database; the leak discovery service detects these connections. This can be done in a variety of manners and without modifying the underlying code or processing associated with the application.

For example, at 111, the leak discovery service identifies connections that are being made from within a database interface. This can be a standard database interface routine, such as JAVA®'s DataSource or it can be any other database interface that the application utilizes to make connections to the database.

Continuing with the embodiment of 111 and at 112, the leak discovery service configures the application to execute a modified database interface in place of the existing database interface. The modified interface communicates with the leak discovery service to identify the connections and to gather additional connection information, as discussed in greater detail below.

At 120, the leak discovery service maintains a unique connection record for each separate connection when that connection is established to the database. So, a record of metadata information is maintained for each connection thread established by the application to the database. A variety of information can be retained in each record.

For example, at 121, the leak discovery service acquires for each connection and its corresponding connection record: a thread identifier for a particular connection thread to the database, an application identifier to unique identify the application, a routine identifier to unique identify a routine within the application that makes a request for a particular connection, and/or a source code location identifier (such as a line number) to identify a particular source code statement within the routine where the particular connection was initially requested.

According to an embodiment, at 122, the leak discovery service maps each connection record to a call stack for a particular thread of the application associated with the connection. So, each record maps to a connection thread to the database.

In another case, at 123, the leak discovery service indexes a record key for each connection record with a connection identifier for the particular connection of that connection record. The record key and the connection identifier include the connection record and a link to an in-memory call stack associated with the particular connection. So, the reserved memory for a particular connection is indexed with the record so that it can be located when the application is closed.

At 130, the leak discovery service reports any remaining connection records that remain when the application is shut down. So, the application can be normally terminated or abnormally terminated and when an event is detected by the leak discovery service indicating that the application is shut down and inspection is made to see if any remaining connection records exist. That is, the leak discovery service removes connections records when connections are closed properly by the application (by detecting close connection calls). So, remaining connection records indicate that there are database connectivity leaks in the application if the records still exist when the application is terminated. These remaining records are reported out, such as to an administrator or to a log file when the application is terminated. This permits a subsequent analysis to be done and the source code of the application revised to correct lingering connection issues in the application source code.

In an embodiment, at 140, the leak discovery service frees in-memory storage reserved for those connections that were associated with the remaining connection records and the leak discovery service also removes the remaining connection records. Here, the leak discovery service cleans up the lingering in memory call stacks for database connectivity leaks by freeing the reserved memory when it is detected that the application has terminated and these call stacks remain.

An example illustration and further discussion is now presented for purposes of comprehension. It is noted that these language specific examples are just illustrations and are not to limit the techniques presented herein to any specific implementation, as others are permissible without departing from the teachings presented herein.

For applications written in the Java programming language, there is a fairly straightforward and efficient means of identifying the exact source of connection leaks during the runtime of an application. Every connection leak is detected and its cause identified and the results provided in a summary log. The approach is documented in the following steps:

(1) Create a Software Wrapper that Implements the Java DataSource Interface.

DataSource : See http://java.sun.com/javase/6/docs/api/javax/sql/DataSource.html
Driver : see http://java.sun.com/javase/6/docs/api/java/sql/Driver.html
Connection : see http://java.sun.com/javase/6/docs/api/java/sql/Connection.html
JDBC : see http://java.sun.com/javase/6/docs/technotes/guides/jdbc/

The most common strategy for connection management in Java containers (Enterprise JavaBeans (EJB), Spring, etc.) is the deployment of a Data Source, which is responsible for acquiring and handing out connections. The approach used herein is to detect connection leaks by creating, in one example embodiment, a Java class that implements the Data Source interface so as to deploy it in the application to be tested. So, the first order of business is to create a "DataSource" class that serves as a software wrapper around the existing DataSource used by the test applications. The software wrapper may contain a reference to an existing JDBC DataSource implementation or the wrapper may contain plumbing to acquire Connections through the JDBC Driver. (These JDBC objects are the standard relational database access methods for Java applications.) The software wrapper also adds instrumentation to the methods of the DataSource interface that return Connection objects. Depending on the deployment environment, it may be necessary to modify container (EJB, Spring, etc.) configuration to point to the DataSource wrapper rather than the DataSource reference it contains.

(2) Add Instrumentation to the DataSource Software Wrapper.

The software wrapper created in Step 1 is modified to keep a (temporary) record of each call stack that acquires a Connection from the DataSource. When the Connection is closed, the temporary record is cleared. Any record that remains when application is shut down indicates a call to the DataSource that opened a connection but did not close it. This is a connection leak. The call stack identifies the caller (client code) that leaked the connection.

It is noted that the DataSource wrapper hands back a connection to a caller, it gets the current call stack. A call stack is a sequential list of class method calls on the current thread of execution. A call stack is saved when the connection is acquired by creating a new Throwable( ) instance, calling its fillInStackTrace( ) and then its getStackTrace( ) method. The results of the getStackTrace( ) can be formatted and stored as a String for later reporting. Formatting is generally a good idea, as the call stacks can take up a lot of space and the calling code that we are interested in is usually the code unique to the application under test. In some cases, the techniques presented are used to filter the call stacks to refer to just the packages in a deployed version of the application.

So, now there is a DataSource wrapper and a handle on the call stacks. These are leveraged as follows. There are a couple of ways to do implementations. One approach would be to have the DataSource wrapper keep an internal Map (http://java.sun.com/javase/6/docs/api/java/util/Map.html) that maintains the stack traces, by Connection, of each requested connection. Whenever a connection is handed out to a piece of client code from the wrapper, a new entry is stored in the map. The entry is created using the returned Connection object as a key, and the value stored under the key is a string representation of the Java stack trace taken at the time of the call to get the connection. Whenever the Connection is closed, its record is removed from the map. This provides a constantly updated snapshot of all the Connections currently in use by the client code. When the application shuts down, look in the map for any entries that were not removed (they were leaked because close was never called) and use the stack trace information in the map to create a formatted report to a trace log or the system console identifying the call stacks of the client code that leaked a connection.

An alternative implementation for keeping track of the leaking clients is done without using a map in the DataSource wrapper. Instead, each Connection (which is really a wrapper—see discussion in step 3 example above) contains a member string representing the call stack of the client code that acquired the Connection from the DataSource wrapper. It is the responsibility of the DataSource wrapper to set the value of the stack information each time it is handed out the Connection to a caller. This implementation is a little different: it establishes a direct link between an active Connection and the call stack of the client that acquired (opened) it. This is the key point. As long as one has this information at application shutdown, one can provide a complete list of all client calls that ended up leaking a connection.

(3) Implement a Connection Wrapper and Override the Close Method.

The DataSource wrapper that was created in step 1 has to wrap the Connections that it hands out to the clients. Java provides some infrastructure Application Programming Interfaces) (APIs to assist with this. See for example:

http://java.sun.com/javase/6/docs/api/javax/sql/ConnectionPoolDataSource.html and
http://java.sun.com/javase/6/docs/api/javax/sql/PooledConnection.html).

However one wraps the Connection, the key issue is being able to keep track of the close( )method calls on it. Whenever the client calls the Connections close method, one needs to remove the stack trace records. Stack trace records should only ever exist for Connections that are have been acquired by client code but never closed.

4. Implement Reporting Code that Will Get Invoked at Application Shutdown.

At this point, a Connection has been opened but is has not yet been closed. But one needs to be able to write the information in a useful way so that the developers can fix the leaking code by adding a close to the Connection. What one needs to do is to tell the Java Virtual Machine (JVM) that one wants to be notified on shutdown so one can look at leaked connections and do some reporting. To get called at VM shutdown, a report class is provided that implements the Java runable interface (http://java.sun.com/javase/6/docs/api/java/lang/Runnable.html). For the purposes of our explanation here, let's assume one calls a class LeakReporter. All that is really required in this class is that in its run( ) method, it implements code that iterates over the current entries in the DataSource wrapper map of open connections (or alternatively, over the set of open connections in the pool) and gets the saved stack traces. Each stack trace is written to a log file, or routed to the system console. In any case, once your reporter is provided, one needs to register it when the application starts up. An example line of code for achieving this is as follows:

---

Runtime.getRuntime( ).addShutdownHook(new Thread(new LeakReport( )));

---

Now when the Virtual Machine (VM) shuts down, each piece of code that opened a connection but failed to close it, is obvious in the reported stack traces.

The one of many advantages of this solution is that it provides a means to easily find a common and usually difficult to diagnose software problem. Prior to this solution, the typical approach to this problem was to manually pore over hundreds or thousands of lines of source code looking for unpaired open/close on Connections. This manual process was very time consuming, and not very effective at all in high concurrency environments. The approach outlined in this new solution negates the need for developers to debug connection leaks manually, and instead keeps them advised on each new application run whether or not the current application code has introduced a connection leak.

Figure 2:
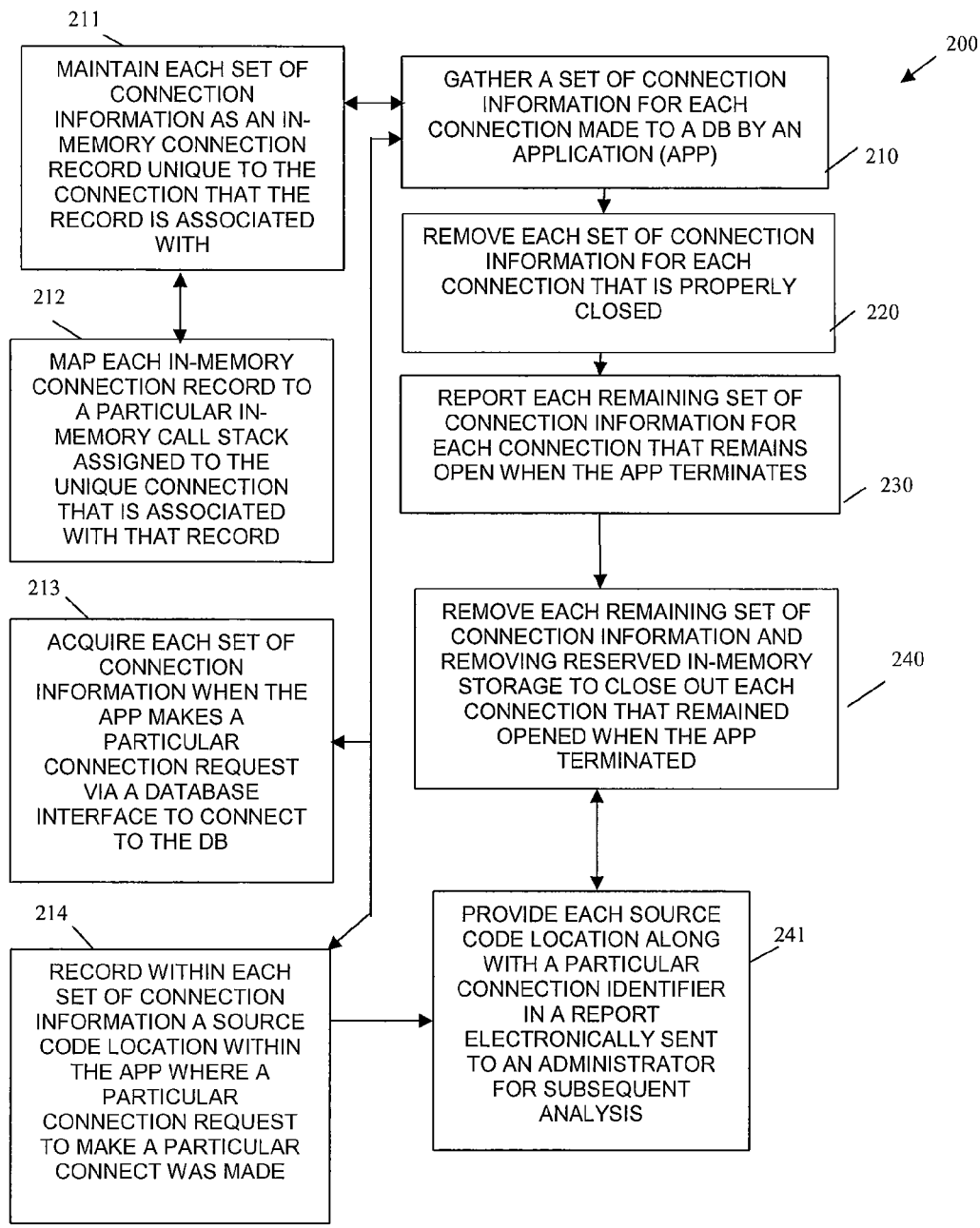
FIG. 2 is a diagram of another method for discovering database connectivity leaks, according to an example embodiment.

FIG. 2 is a diagram of another method 200 for discovering database connectivity leaks, according to an example embodiment. The method 200 (hereinafter referred to as "leak monitoring service") resides and is implemented in a computer-readable storage medium and executes on one or more processors of the network. The network may be wired, wireless, or a combination of wired and wireless.

The leak monitoring service provides another and in some cases enhanced perspective of the leak discovery service represented by the method 100 of the FIG. 1.

At 210, the leak monitoring service gathers a set of connection information for each connection made to a database by an application. Again, the application is a front-end application to the database that is capable of handling requests from a plurality of clients that access the database over a network, such as the Internet.

In an embodiment, at 211, the leak monitoring service maintains each set of connection information as an in-memory connection record that is unique to the connection that the record is associated with. So, each unique connection to the database includes its own maintained set of connection information. This information can include a variety of details, such as but not limited to: an application identifier, a routine identifier (for a routine that requested the connection within the source code of the application), a source code statement identifier for the source statement where the connection request was made inside the source code of the application, data and time connection was established, user that established the application, and the like.

Continuing with the embodiment of 211 and at 212, the leak monitoring service maps each in-memory connection record to a particular in-memory call stack assigned to the unique connection that is associated with that record. The call stack for each connection is mapped and linked to the connection record being maintained by the leak monitoring service.

In a particular situation, at 213, the leak monitoring service acquires each set of connection information when the application makes a particular connection request via a database interface to connect to the database. Again, the processing of the leak monitoring service is interjected into the database interface that establishes connections to the database as described above with reference to the method 100 of the FIG. 1.

In yet another case, at 214, the leak monitoring service records within each set of connection information a source code location within the application where a particular connection request to make a particular connection was made. This can provide invaluable information to a developer or analyst by pinpointing where in the source code of the application a connection request was made that was never properly closed when the application terminated.

At 220, the leak monitoring service removes each set of connection information for each connection that is properly closed. In other words, when a connection is closed an event is detected and the set of connection information associated with the closed connection is removed and no longer tracked by the leak monitoring service.

At 230, the leak monitoring service reports each remaining set of connection information for each connection that remains open when the application terminates. So, any set of connection information that remains when the application is detected as having terminated, the leak monitoring service knows this is a database connectivity leakage situation. This set of connection information is then reported. The report can be made electronically and automatically to an administrator or logged to a file or database location for subsequent analysis.

According to an embodiment, at 240, the leak monitoring service removes reach remaining set of connection information and removes reserved in-memory storage to close out each connection that remained opened when the application terminated. So, not only does the leak monitoring service report database connectivity leakages but the leak monitoring service can correct and clean such leakages.

Continuing with the embodiment of 240 and of 214, and at 241, the leak monitoring service provides each source code location along with a particular connection identifier in a report that is then electronically sent to an administrator for subsequent analysis. So, the administrator can modify the source code of the application by inspecting the report in the proper location to resolve the database connectivity issues going forward with the application.

Figure 3:
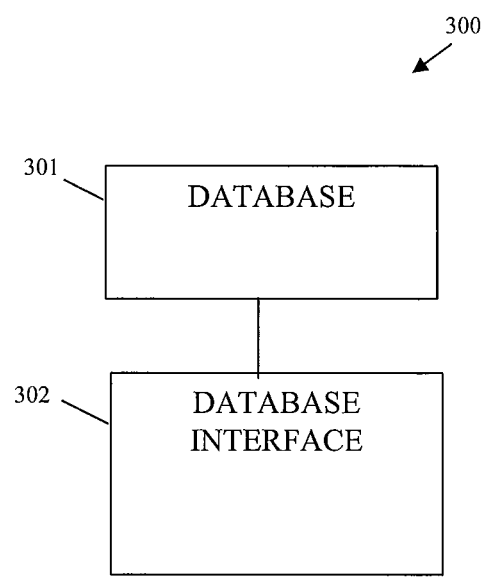
FIG. 3 is a diagram of a database connectivity leak discovery system, according to an example embodiment.

FIG. 3 is a diagram of a database connectivity leak discovery system 300, according to an example embodiment. The database connectivity leak discovery system 300 is implemented in a computer-readable storage medium and executes on one or more processors of a network. The network may be wired, wireless, or a combination of wired and wireless.

In an embodiment, the database connectivity leak discovery system 300 implements, inter alia, the methods 100 and 200 of the FIGS. 1 and 2, respectively.

The database connectivity leak discovery system 300 includes a database 301 and a database interface 302. Each of these and their interactions with one another will now be discussed in turn.

The database 301 is implemented in a computer-readable storage medium and executes on one or more processors of a network. Example aspects of the database 301 related to connectivity were discussed above with reference to the methods 100 and 200 of the FIGS. 1 and 2, respectively.

The database interface 302 is implemented in a computer-readable storage medium and executes on the one or more processors of the network. Processing features associated with the database interface 302 were discussed in detail above with reference to the methods 100 and 200 of the FIGS. 1 and 2, respectively.

The database interface 302 is configured to maintain a unique connection record for each connection made by an application to the database 301. The database interface 302 is also configured to remove each particular connection record when a particular connection is closed properly from within the application. The database interface 302 further configured to report each remaining record when a remaining connection remains open when the application shuts down.

According to an embodiment, the database interface 302 is configured as a wrapper that acts as a preprocessor and post processor to an existing database interface used by the application to access the database 301. In other words, input to the existing database interface and output from the existing database interface passes through the database interface 302 that is configured as a wrapper around the existing database interface.

In another situation, the database interface 302 is configured to be processed by the application in place of an existing database interface for the application. This is done by altering a configuration file associated with the application to point to the database interface 302 and not the application's existing database interface.

Also, the database interface 302 is configured to remove an in-memory call stack reserved for the remaining connection when the application is shut down.

Still further, the database interface 302 is configured to identify a specific source code line number for specific source statement within a source code version of the application. The specific source code statement corresponding to a particular application call used to establish the remaining connection that was not closed when the application shut down.

In yet another case, the database interface 302 is configured to generate a report that is: logged to a particular network location, emailed to a particular pre-defined recipient, texted to the recipient, and/or instant messaged to the recipient.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory computer-readable storage medium and processed by a processor to perform the method, comprising:
   detecting, by the processor, connections made to a database from an application;
   maintaining, by the processor, a unique connection record for each separate connection when that connection is established to the database and maintaining an internal map having a new entry for each separate connection and its unique connection record, each new entry having a key for a connecting object stored with that new entry in the internal map along with a value for that key, that value is a string representing a stack trace taken at a time of a call to get the separate connection to which the new entry relates; and
   reporting, by the processor, any remaining connection records that remain when the application is shut down as connection leaks.

2. The method of claim 1, wherein detecting further includes identifying the connections from within a database interface.

3. The method of claim 2, wherein identifying further includes configuring the application to execute a modified database interface in place of the database interface, the modified interface identifying the connections.

4. The method of claim 1, wherein maintaining further includes acquiring for each connection and its connection record: a thread identifier for a particular connection thread to the database, an application identifier for the application, a routine identifier to identify a routine within the application making the particular connection, and a source code location identifier to identify a particular source code statement within the routine where the particular connection was requested.

5. The method of claim 1, wherein maintaining further includes mapping each connection record to a call stack for a particular thread of the application associated with that connection.

6. The method of claim 1, wherein maintaining further includes indexing a record key for each connection record with a connection identifier for the particular connection of that connection record, the record key and connection identifier including that connection record and a link to an in-memory call stack associated with the particular connection.

7. The method of claim 1 further comprising, freeing, by the processor, in-memory storage reserved for those connections that were associated with the remaining connection records and then removing the remaining connection records.

8. A method implemented in a non-transitory computer-readable storage medium and processed by a processor to perform the method, comprising:
   gathering, by the processor, a set of connection information for each connection made to a database by an application, each connection including a string representing a connection call stack for that connection;
   removing, by the processor, each set of connection information for each connection that is properly closed; and
   reporting, by the processor, each remaining set of connection information for each connection that remains open when the application terminates, each remaining set of connection information identified as a connection leak available from that remaining connection's string.

9. The method of claim 8 further comprising, removing, by the processor, each remaining set of connection information and removing reserved in-memory storage to close out each connection that remained opened when the application terminated.

10. The method of claim 8, wherein gathering further includes maintaining each set of connection information as an in-memory connection record unique to the connection that the record is associated with.

11. The method of claim 10, wherein maintaining further includes mapping each in-memory connection record to a particular in-memory call stack assigned to the unique connection that is associated with that record.

12. The method of claim 8, wherein gathering further includes acquiring each set of connection information when the application makes a particular connection request via a database interface to connect to the database.

13. The method of claim 8, wherein gathering further includes recording within each set of connection information a source code location within the application where a particular connection request to make a particular connection was made.

14. The method of claim 13, wherein reporting further includes providing each source code location along with a particular connection identifier in a report electronically sent to an administrator for subsequent analysis.

15. A processor-implemented system, comprising:
  one or more processors having a database implemented in a non-transitory computer-readable storage medium and executed on the one or more processors of a network; and
  the one or more processors also having a database interface implemented in a non-transitory computer-readable storage medium and executed on the one or more processors of the network;
  the database interface configured to maintain a unique connection record for each connection made by an application to the database, the database interface further configured to remove each particular connection record when a particular connection is closed properly from within the application and the database interface configured to report each remaining connection record when a remaining connection remains open when the application shuts down as a connection leak by iterating over an internal map of the unique connection records to acquire stack traces for opened connections.

16. The system of claim 15, wherein database interface is configured as a wrapper that acts as a preprocessor and post processor to an existing database interface used by the application to access the database.

17. The system of claim 15, wherein the database interface is configured to be processed by the application in place of an existing database interface for the application via a configuration file associated with the application.

18. The system of claim 15, wherein the database interface is also configured to remove an in-memory call stack reserved for the remaining connection when the application is shut down.

19. The system of claim 15, wherein the database interface is configured to identify a specific source code line number for specific source statement within a source code version of the application, the specific source code statement corresponding to a particular application call used to establish the remaining connection that was not closed when the application shut down.

20. The system of claim 15, wherein the database interface is configured to generate a report that is: logged to a particular network location, emailed to a particular pre-defined recipient, texted to the recipient, or instant messaged to the recipient.

* * * * *